United States Patent
Shinoda et al.

(10) Patent No.: US 6,933,881 B2
(45) Date of Patent: Aug. 23, 2005

(54) AUTOMOTIVE RADAR

(75) Inventors: Hiroshi Shinoda, Kokubunji (JP); Hiroshi Kondoh, Fuchu (JP); Shiho Izumi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 10/618,736

(22) Filed: Jul. 15, 2003

(65) Prior Publication Data

US 2005/0001757 A1 Jan. 6, 2005

(30) Foreign Application Priority Data

Apr. 23, 2003 (JP) ...................................... P2003-118044

(51) Int. Cl.$^7$ ......................... G01S 13/93; H01Q 17/00
(52) U.S. Cl. ............................................. 342/70; 342/1
(58) Field of Search ........................... 342/1–12, 70–72, 342/159

(56) References Cited

U.S. PATENT DOCUMENTS

| | | | |
|---|---|---|---|
| 5,525,988 A | * 6/1996 | Perkins et al. | 342/4 |
| 6,081,223 A | * 6/2000 | Kitahara et al. | 342/70 |
| 6,335,680 B1 | * 1/2002 | Matsuoka | 340/435 |
| 6,335,699 B1 | * 1/2002 | Honma | 342/4 |
| 6,496,138 B1 | * 12/2002 | Honma | 342/70 |
| 2001/0026237 A1 | * 10/2001 | Okai et al. | 342/70 |
| 2002/0145570 A1 | 10/2002 | Barnes et al. | 343/824 |

FOREIGN PATENT DOCUMENTS

| | | | |
|---|---|---|---|
| DE | 4412770 A1 | 10/1995 | |
| FR | 2782846 | 3/2000 | |
| JP | 04140905 | 5/1992 | |
| JP | 10093329 A | * 4/1998 | .......... H01Q/13/08 |
| JP | 2002-104070 | 4/2002 | |

OTHER PUBLICATIONS

"76GHz Wide-angle Automotive Radar System", 2001 General Conference of the Institute of Electronics, Information and Communication Engineers, Technical Papers (Engineering Science), Paper No. 1 A–17–10, p. 391.
"MMIC Transceiver Integrated with a Planar Antenna for Automotive RAdar Application", MWE 2001 (Microwave Workshops and Exhibition) Dec. 2001, Workshop Technical Program, Paper No. WS5–1.

* cited by examiner

*Primary Examiner*—Thomas H. Tarcza
*Assistant Examiner*—Isam Alsomiri
(74) *Attorney, Agent, or Firm*—Mattingly, Stanger & Malur, P.C.

(57) ABSTRACT

An automotive radar having a high level of azimuth accuracy and a broad detectable range by virtue of preventing leaks of unnecessary waves to receiving antennas is to be provided. A transmitting array antenna 1 and receiving array antennas 2a, 2b are arranged on an antenna plate (grounding conductor plate) 3 which serves to ground the antennas, and radio wave absorbers 4 are arranged on two sides of the edges 15 of the antenna plate 3. The radio wave absorbers 4 may be configured of, for instance, a sponge material containing radio wave absorbing grains.

14 Claims, 8 Drawing Sheets

AUTOMOTIVE RADAR

FIELD OF THE INVENTION

The present invention relates to an automotive radar to be mounted on a mobile object, such as a wheeled vehicle, to detect the azimuth of an obstacle, its distance from the mobile object and relative speed.

BACKGROUND OF THE INVENTION

Automotive radars using millimeter waves are attracting interest as being most suitable for use in the prevention of car collisions and in following another vehicle as they are less susceptible to the interference of rain, fog, snow and other weather factors, dust and noise than ultrasonic radars and laser radars. Millimeter wave radars currently available in the market are mainly intended for use along expressways, and their detectable range and reach are approximately 16 degrees in azimuth angle and about 150 m in distance, respectively.

Automotive radars are further expected to be applied in the near future to a more complex road environment, such as ordinary roads, and this would inevitably necessitate a broader detectable range of 80 degrees or more in azimuth angle.

Techniques available to meet this need include a method widening a receiving angle of antenna on the basis of use of a plurality of receiving antennas and a monopulse system of detecting the azimuth of the obstacle from the amplitude difference or the phase difference among the signals received by the receiving antennas. For instance, non-patent reference 1: 2001 General Conference of the Institute of Electronics, Information and Communication Engineers, Technical Papers (Engineering Science), Paper No. A-17-10, p. 391 discloses a technique to broaden the detectable range by using a monopulse system for azimuth detection and keeping the number of antenna elements intentionally small. Besides that, for instance, non-patent reference 2: MWE 2001 (Microwave Workshops and Exhibition) held in Yokohama in December, 2001, Workshop Technical Program, Paper No. WS5-1 contains a description of an automotive radar transmitter/receiver apparatus embodied in such a method.

FIG. 11 shows the circuit configuration of a radar transmitter/receiver apparatus described in the non-patent reference 2. For a wide-angle transmitting antenna 1 and receiving antennas 2a and 2b, microstrip-patch planar antennas based on microstrip lines are used. A millimeter wave signal outputted by an oscillator 7 is supplied to the transmitting antenna 1 via a power amplifier 6. The signal transmitted from the transmitting antenna 1 and reflected by an obstacle is received by the receiving antennas 2a and 2b, and supplied to a hybrid circuit (HYB) 5. The hybrid circuit 5 generates a sum signal $\Sigma$ and a differential signal $\Delta$. The sum signal $\Sigma$ and the differential signal $\Delta$ are respectively processed by receiver circuits 20a and 20b, each mainly consisting of a mixer to detect the azimuth and other factors of the object of detection.

SUMMARY OF THE INVENTION

As described above, in the monopulse system, the detecting range is broadened by widening the angle of the antenna beam. However, a widen angle of the antenna beam inevitably brings an increase in unnecessary sidelobes (subbeams of weaker intensity radiating in different directions from the main beam) The sidelobes cause leaks of unnecessary waves from the transmitting antenna to the receiving antennas, which would bring a deterioration in azimuth accuracy and an increase in wrong detections.

The unnecessary waves leak via two routes. On one route, reflected waves returning after being Doppler-shifted by an obstacle are diffracted at an edge of a plate (conductor plate) which fixes the antennas and serves to ground the antennas are received by the receiving antennas. On the other route, the reflected waves are received by a transmitting antenna, and part of them are reflected due to mismatching within the transmitting antenna to be radiated again to leak to the receiving antennas.

In the monopulse system, because the azimuth of the obstacle is determined according to the amplitude and phase of receive signals, the problem noted above leads to significant deterioration of the azimuth accuracy and wrong detection.

An object of the present invention is to obviate the problem noted above and to provide a low-cost, compact and light-weight automotive radar that excels in azimuth accuracy over a wide detectable range.

The problem the present invention addresses can be effectively solved by providing a diffracted wave prevention structure at edges, at least partly, of the top face of a grounding conductor plate which grounds antennas in an automotive radar to be mounted on a mobile object, such as a wheeled vehicle, to detect the azimuth of an obstacle, its distance from the mobile object and relative speed. The diffracted wave prevention structure may comprise, for instance, a radio wave absorber covering the top face edges at least in part and arranged on the top face of the grounding conductor plate, because the use of such means can prevent diffracted waves from being generated at the edges of the grounding conductor plate, and unnecessary waves can be thereby prevented from leaking to the receiving antennas, accordingly to achieve a high level of azimuth accuracy.

It is preferable to provide a radio wave absorber between the transmitting antenna and the receiving antennas. This arrangement can prevent leaks from the transmitting antenna to the receiving antennas, resulting in a high level of azimuth accuracy.

Further, by configuring the radio wave absorber of a sponge material containing radio wave absorbing grains, the automotive radar can be easily produced in light weight and at low cost.

Also, by fitting in advance the radio wave absorber to a radome (a protective cover for the radar) covering the front of the antennas, the number of assembling processes can be reduced.

Further by so selecting the height of the radio wave absorber from the top face of the antennas as to prevent radio waves from radiating, or arriving from, outside the range of obstacle detecting angles, diffracted waves can be prevented from leaking from the grounding edge or leaks from the transmitting antenna to the receiving antennas can be prevented, resulting in a further contribution to azimuth accuracy improvement.

Also, by having the transmitting antenna protrude farther ahead than the receiving antennas, leaks from the transmitting antenna to the receiving antennas can be prevented, resulting in a further enhanced level of azimuth accuracy.

These and other objects and many of the attendant advantages of the invention will be readily appreciated as the same becomes better understood by reference to the following

DETAILED DESCRIPTION OF THE PREFERRED EMBODIMENTS

An automotive radar according to the present invention will be described in further detail below with reference to a number of preferred embodiments of the invention illustrated in accompanying drawings. The same reference signs in FIG. 1 through FIG. 11 denote either the same or similar elements, respectively.

Figure 1:
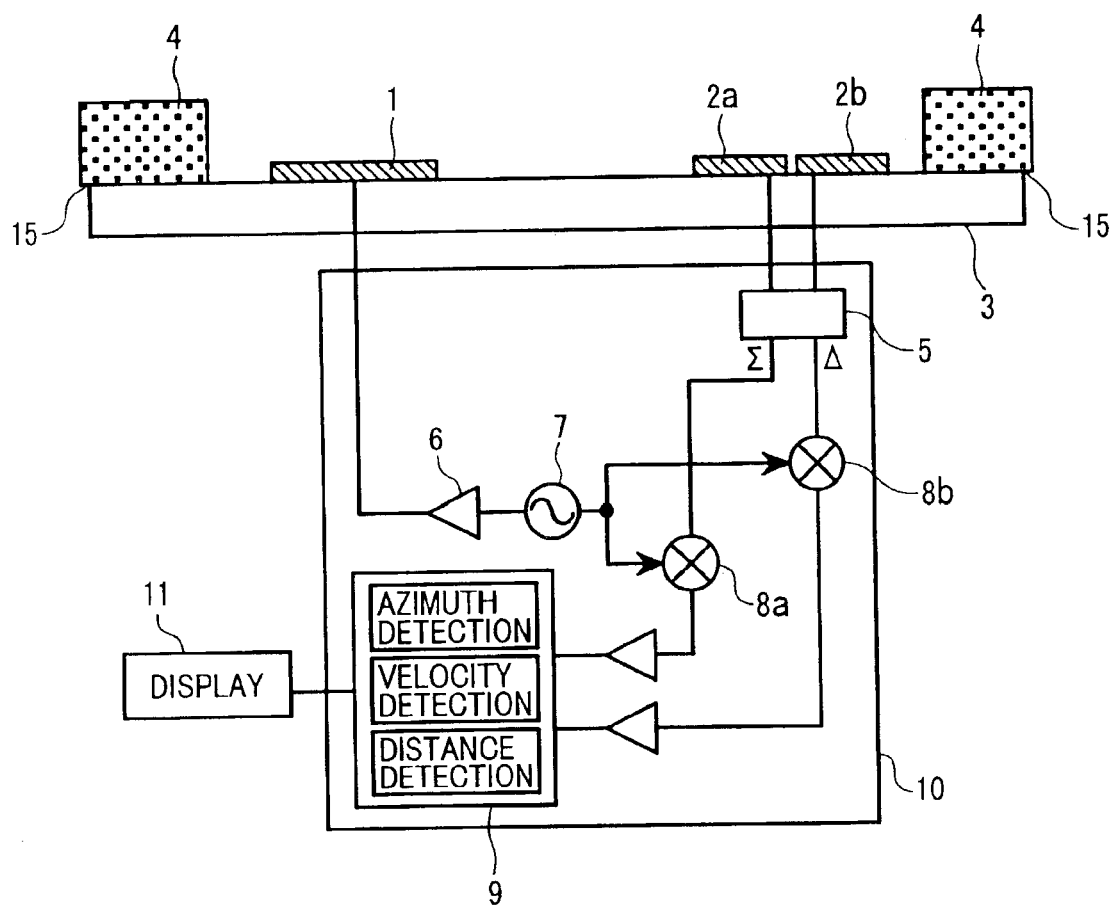
FIG. 1 is a block diagram of an automotive radar, which is a first preferred embodiment of the present invention.

FIG. 1 shows an automotive radar, which is a first preferred embodiment of the invention. In this embodiment, a transmit signal is transmitted from a radar transmitter/receiver apparatus 10 via a transmitting array antenna 1, and signals reflected by an obstacle are received by a receiving array antenna 2a and an receiving array antenna 2b. The two receive signals from the array antennas 2a and 2b are sent to the radar transmitter/receiver apparatus 10 provided with a hybrid circuit 5 for generating a sum signal and a differential signal. The effective areas of the antenna 1 and the array antennas 2a and 2b are shaped in narrow and long strips, and serve to broaden the main beam in widthwise direction.

In the radar transmitter/receiver apparatus 10, a millimeter wave signal generated by the oscillator 7 is supplied to the transmitting array antenna 1 via a power amplifier 6. On the other hand, the hybrid circuit 5, into which the two receive signals from the array antennas 2a and 2b are inputted, generates a sum signal $\Sigma$ and a differential signal $\Delta$. These signals are supplied to mixers 8a and 8b, respectively, to be mixed with the output signal of the oscillator 7 and converted into intermediate frequency signals, which are inputted into a signal processing circuit 9. The signal processing circuit 9 detects the azimuth of the object of detection by using signals resulting from the frequency conversion of the sum signal $\Sigma$ and the differential signal $\Delta$, and detects the speed, position and other factors of the object of detection by using the sum signal $\Sigma$. The result of these detections are converted, as required, into signals suitable for an output device, such as a display 11, and supplied to the output device.

This embodiment has an antenna plate (antenna conductor plate) 3 over which the transmitting array antenna 1 and the receiving array antennas 2a and 2b are arranged and which serves to ground the antennas, and radio wave absorbers 4 are arranged on two sides of edges 15 of the antenna plate 3.

Figure 2:
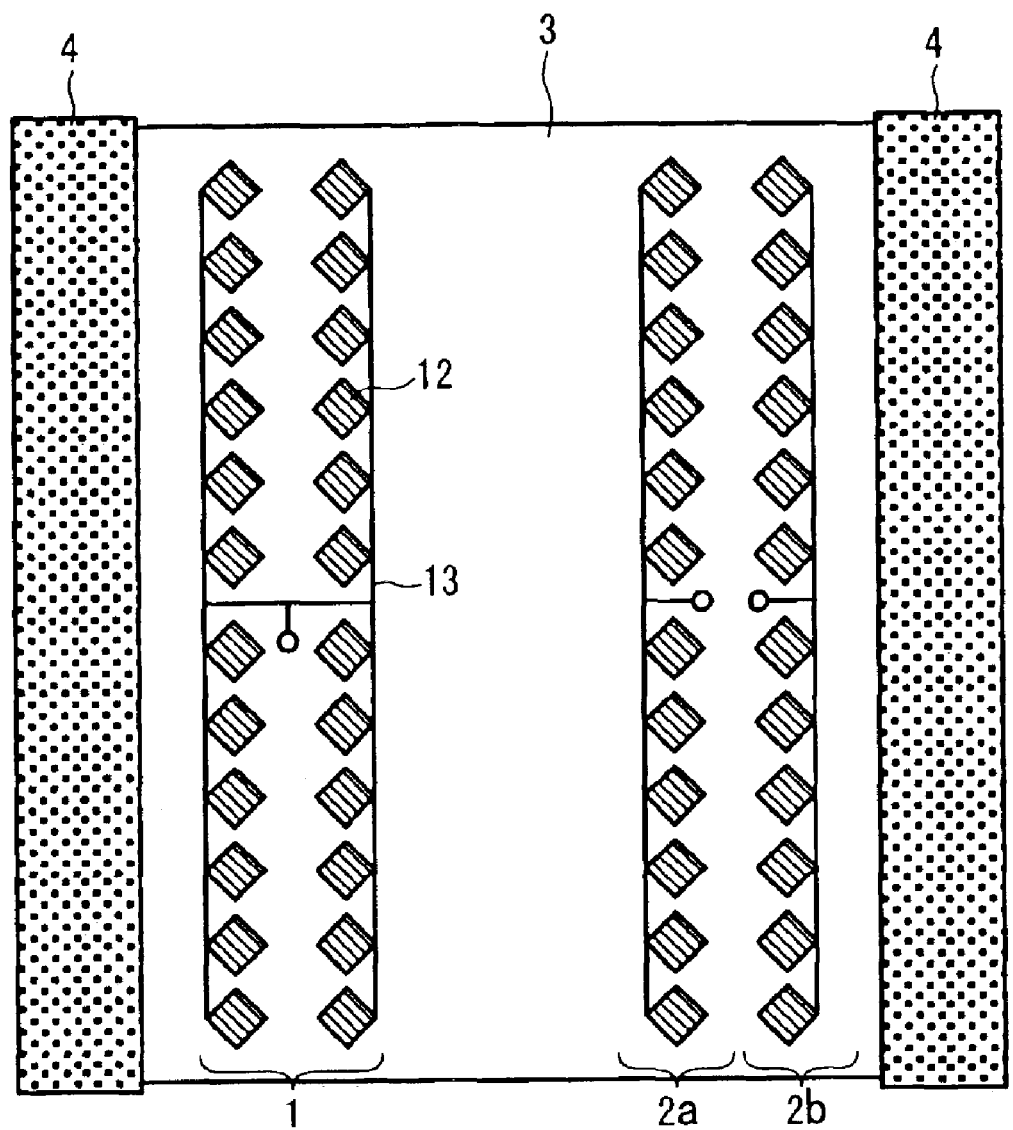
FIG. 2 shows a front view of the first preferred embodiment of the invention.

FIG. 2 shows a top view of the antennas used in the first embodiment of the invention. A plurality of patch elements 12 and feeding lines 13 are configured over a dielectric substrate to constitute the transmitting array antenna 1 and the receiving array antennas 2a and 2b. Each of these array antennas is arranged on the antenna plate 3, and the radio wave absorbers 4 are arranged on the two sides of the edges 15 of the antenna plate 3.

In case of the absence of the radio wave absorbers 4, the reflected wave which has been Doppler-shifted by the obstacle and returned, would be diffracted by the edges 15 of the antenna plate 3 and become scattering unnecessary waves, part of which would come incident on the receiving array antennas 2a and 2b, but in this embodiment of the invention the reflected waves directed towards the edges 15 are absorbed by the radio wave absorbers 4 and thereby prevented from reaching the edges 15. Therefore, the generation of unnecessary waves by diffraction is prevented, and so the problem of unnecessary waves leaking to the antennas 2a and 2b is solved. Even if there is any remaining portion of the reflected waves not completely attenuated by the radio wave absorbers 4, any unnecessary waves generated by the diffraction of that portion of the reflected wave by the edges 15 will be further absorbed by the same radio wave absorbers 4, and do not reach the antennas 2a and 2b. As a result, wrong detection can be prevented, and a high level of azimuth accuracy can be achieved.

Figure 3:
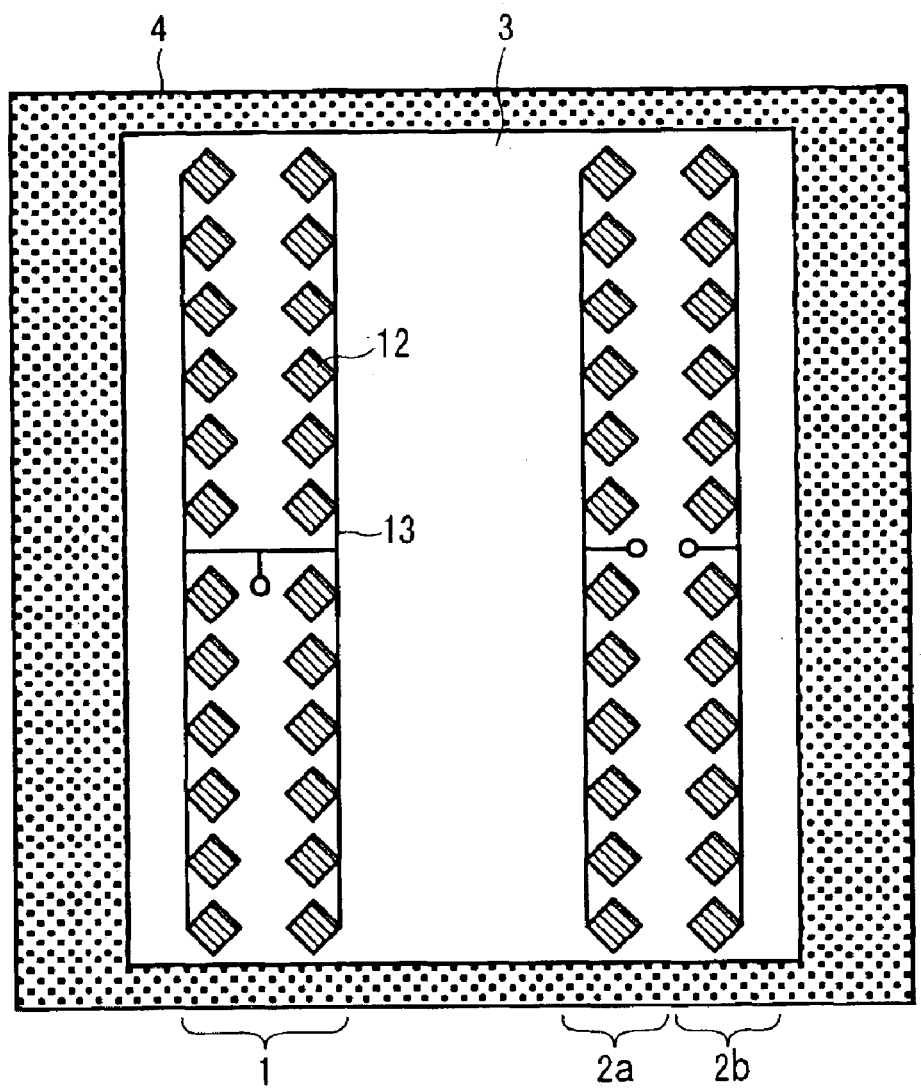
FIG. 3 shows a front view of a second preferred embodiment of the invention.

FIG. 3 shows an automotive radar, which is a second preferred embodiment of the invention. In this embodiment, a plurality of patch elements 12 and feeding lines 13 are formed over a dielectric substrate to constitute a transmitting array antenna 1 and receiving array antennas 2a and 2b. These array antennas are arranged on an antenna plate 3, and a radio wave absorber 4 is disposed around the edges of the antenna plate 3.

In this embodiment of the invention, the returning reflected wave Doppler-shifted by the obstacle is absorbed by the radio wave absorber 4 on its way to the edges of the antenna plate 3. The generation of unnecessary waves is thereby prevented, and so the problem of unnecessary waves being received by the receiving antennas 2a and 2b is solved.

Since the whole edges of the antenna plate 3 are covered by the radio wave absorber 4 in this embodiment, the absorption can be effective against diffracted waves not only in the lateral but also in the longitudinal direction of the drawing and, accordingly, wrong detection can be prevented, resulting in a high level of azimuth accuracy.

Figure 4:
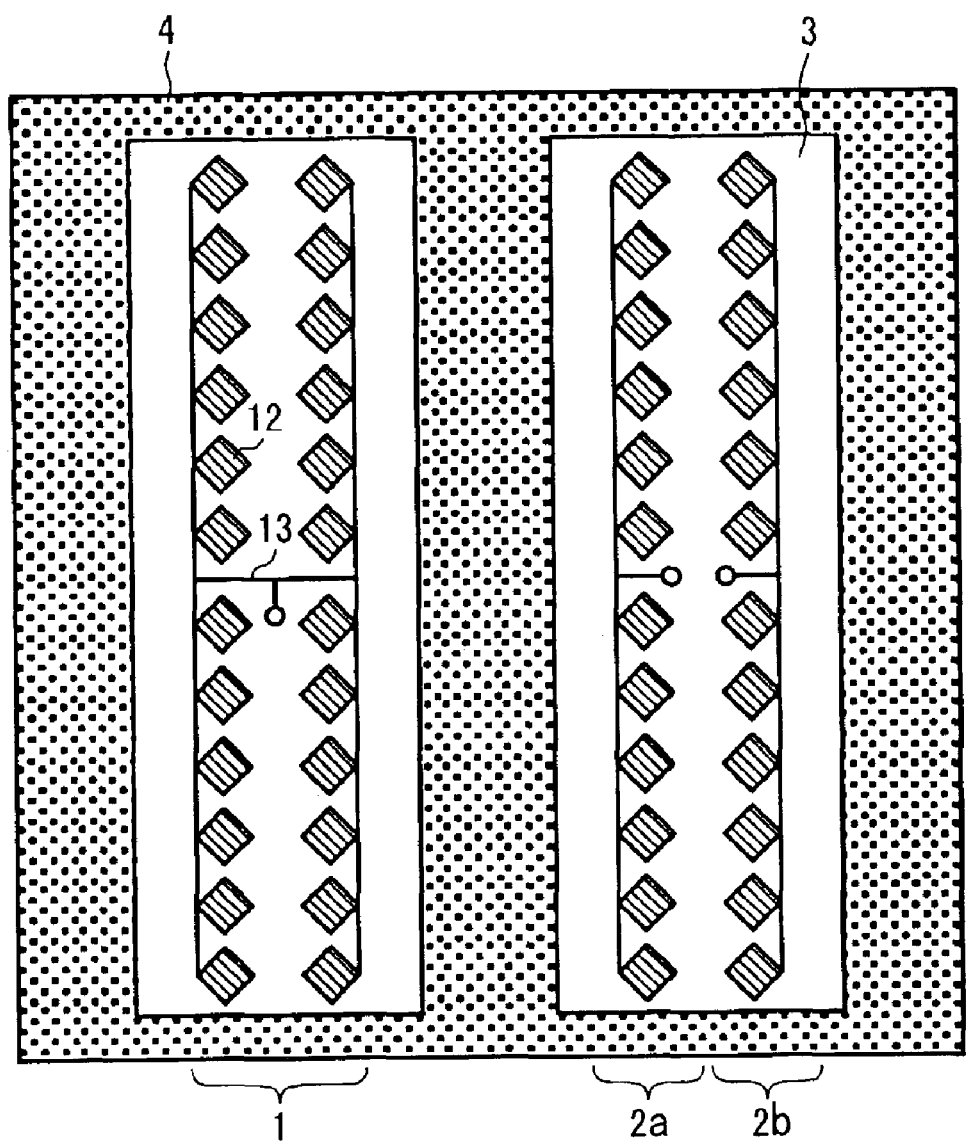
FIG. 4 shows a front view of a third preferred embodiment of the invention.

FIG. 4 shows an automotive radar, which is a third preferred embodiment of the invention. In this embodiment, a plurality of patch elements 12 and feeding lines 13 are formed over a dielectric substrate to constitute a transmitting array antenna 1 and receiving array antennas 2a and 2b. While these array antennas are arranged on the antenna plate 3, in this embodiment particularly, radio wave absorbers 4 are arranged between the transmitting/receiving antennas in addition to around the edges of the antenna plate 3.

In this embodiment of the invention, by arranging the radio wave absorbers 4 in this way, not only is the returning reflected wave Doppler-shifted by the obstacle prevented from being diffracted by the edges of the antenna plate 3 but also can unnecessary waves directed towards the receiving antennas 2a and 2b resulting from reradiation from the transmitting antenna 1 be absorbed and intercepted. The reflected wave from the obstacle comes incident on not only the receiving antennas 2a and 2b but also the transmitting antenna 1. The reflected wave coming incident on the transmitting antenna 1 will be reflected, if there is any impedance mismatching within the transmitting antenna 1, and reradiated from the transmitting antenna 1. This reradiated component becomes unnecessary waves, part of which would come incident on the receiving array antennas 2a and 2b if there were no radio wave absorbers 4.

In this embodiment of the invention, as in the second embodiment, the whole edges of the antenna plate 3 are covered by the radio wave absorbers, and accordingly the absorption can be effective against diffracted waves not only in the lateral but also longitudinal direction of the drawing, with the result that wrong detection can be prevented and a high level of azimuth accuracy can be achieved.

Figure 5:
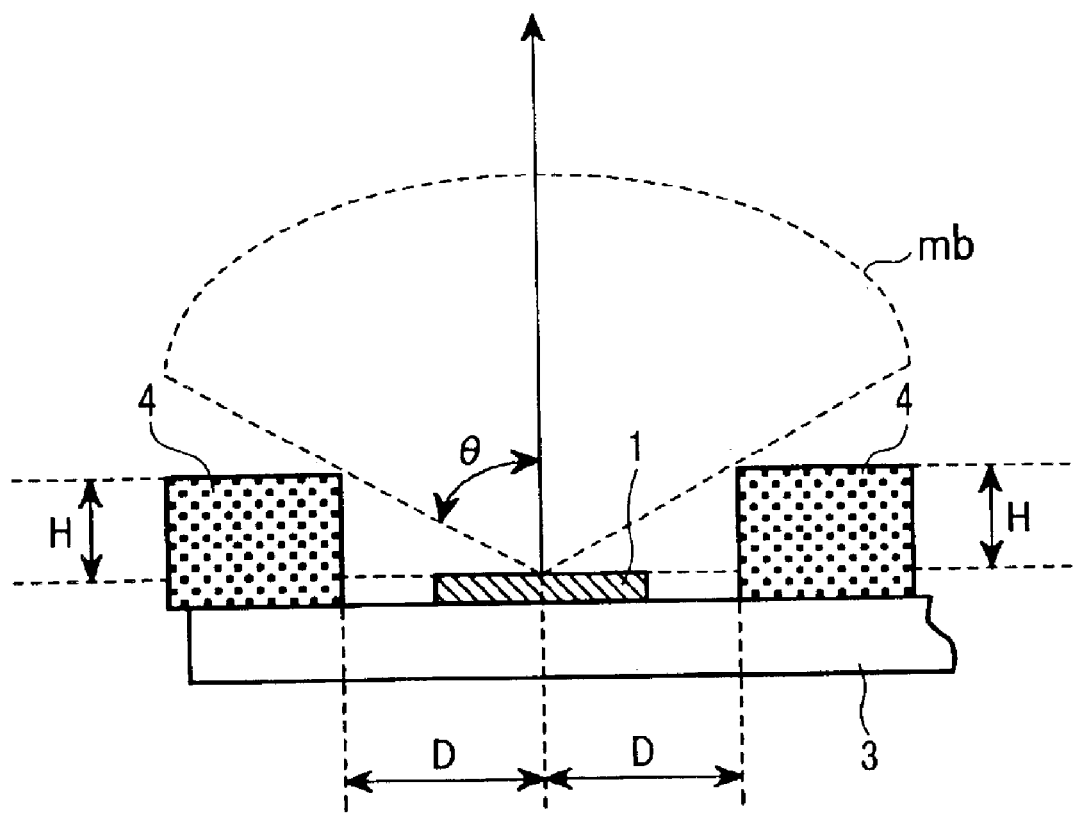
FIG. 5 is a diagram for explaining the optimal positions and size of the radio wave absorbers in the preferred embodiments of the invention.

Hereupon, the optimal positions and size of the radio wave absorbers 4 relative to the transmitting antenna 1 will be explained with reference to FIG. 5. The transmitting array antenna 1 and the radio wave absorbers 4 are arranged on the antenna plate 3, and a main beam mb having a radiation angle 2θ required for achieving a desired azimuth detecting performance is supplied from the transmitting array antenna 1. Then, assuming that the antenna 1 is thin enough, the optimal values of the height H of the radio wave absorbers 4 from the top face of the antenna 1 and of the distance D of each of them from the center of the antenna are given by Equation (1):

$$\tan \theta = D/H \qquad (1)$$

By so selecting D and H as to satisfy this equation, radio waves radiated outside the range of obstacle detecting angles can be intercepted, resulting in high azimuth accuracy. For the receiving array antennas 2a and 2b as well, the optimal positions and size of the radio wave absorbers 4 can be selected so as to intercept radio waves coming incident outside the range of obstacle detecting angles. Thus, when radio waves are reaching the receiving antennas 2a and 2b from the range of an incident angle 2θ required for acquiring desired azimuth detecting performance, the optimal values of the height H of the radio wave absorbers 4 from the top faces of the antennas 2a and 2b and of the distance D of each of them from the center of the pertinent antenna are given by Equation (1) stated above.

It goes without saying that, while the optimal positions and size of the radio wave absorbers 4 have been explained with reference to the third embodiment of the invention, they can be applied to the first and second embodiments as well.

The radio wave absorbers 4 for use in the first through third embodiments of the invention can be easily produced in light weight and at low cost by using a sponge material containing radio wave absorbing grains, such as carbon grains.

Figure 6:
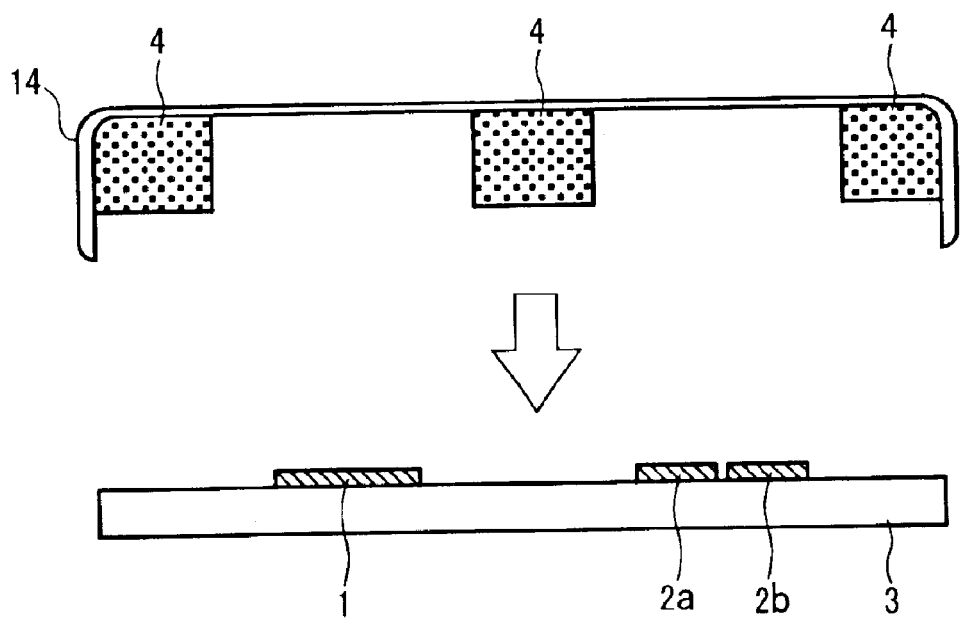
FIG. 6 is a diagram for describing the method of mounting the radio wave absorbers in the first through third preferred embodiments of the invention.

FIG. 6 shows a typical process of mounting the radio wave absorbers 4 in the first through third preferred embodiments of the invention. While the transmitting array antenna 1 and the receiving array antennas 2a and 2b are arranged on the antenna plate 3 which is to ground the antennas, the radio wave absorbers 4 are fitted in advance to a radome 14 covering the front of the antennas. This enables the radio wave absorbers 4 to be arranged in appropriate positions at the same time as the fitting of the radome 14 to the antenna plate 3, achieving a substantial curtailment of the assembling process.

Figure 7:
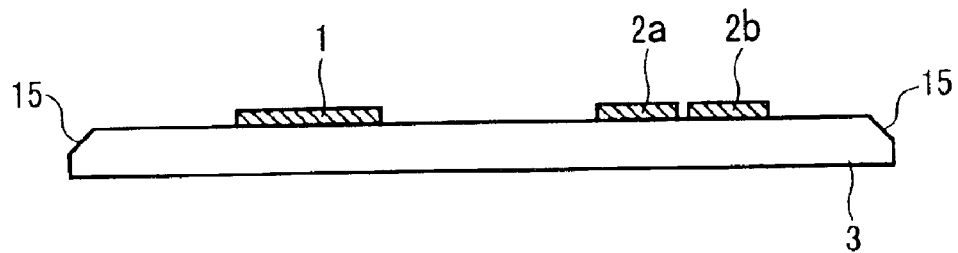
FIG. 7 shows a sectional view of a fourth preferred embodiment of the invention.

FIG. 7 shows an automotive radar, which is a fourth preferred embodiment of the present invention. In this embodiment, the edges 15 of the antenna plate 3 on which the transmitting array antenna 1 and the receiving array antennas 2a and 2b are arranged and which serves to ground the antennas are chamfered.

In this embodiment, since the edges 15 of the antenna plate 3 are chamfered, the returning reflected wave which is Doppler-shifted by the obstacle is hardly diffracted at the edges 15, and accordingly unnecessary waves can be prevented from being generated. Therefore, wrong detection can be prevented and a high level of azimuth accuracy can be achieved. Incidentally, although the edges 15 shown in FIG. 7 are chamfered to have two faces, they can as well be chamfered to have three or more faces with similar effectiveness.

Figure 8:
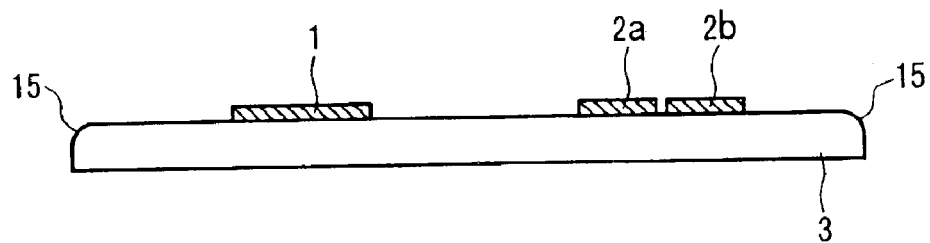
FIG. 8 shows a sectional view of a fifth preferred embodiment of the invention.

FIG. 8 shows an automotive radar, which is a fifth preferred embodiment of the present invention. In this embodiment, the edges 15 of the antenna plate 3 on which the transmitting array antenna 1 and the receiving array antennas 2a and 2b are arranged and which serves to ground the antennas are curved.

In this embodiment, since the edges 15 of the antenna plate 3 are curved, the returning reflected wave which is Doppler-shifted by the obstacle is hardly diffracted at the edges 15, and accordingly unnecessary waves can be prevented from being generated. Therefore, wrong detection can be prevented and a high level of azimuth accuracy can be achieved.

Figure 9:
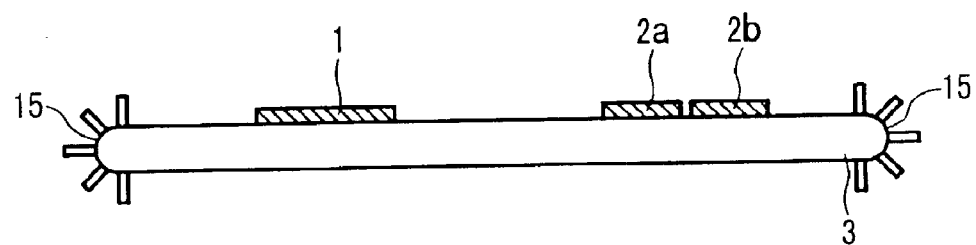
FIG. 9 shows a sectional view of a sixth preferred embodiment of the invention.

FIG. 9 shows an automotive radar, which is a sixth preferred embodiment of the present invention. In this embodiment, the edges 15 of the antenna plate 3 on which the transmitting array antenna 1 and the receiving array antennas 2a and 2b are arranged and which serves to ground the antennas are provided with projections 16.

In this embodiment, since the edges 15 of the antenna plate 3 are provided with the projections 16, the returning reflected wave which is Doppler-shifted by the obstacle is hardly diffracted at the edges 15, and accordingly unnecessary waves can be prevented from being generated. Therefore, wrong detection can be prevented and a high level of azimuth accuracy can be achieved.

In addition, the effectiveness of this configuration can be particularly enhanced by setting the height of the projections 16 to ¼ of the frequency used.

Figure 10:
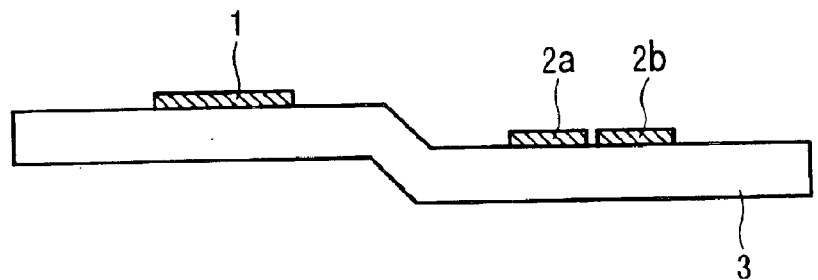
FIG. 10 shows a sectional view of a seventh preferred embodiment of the invention.
Figure 11:
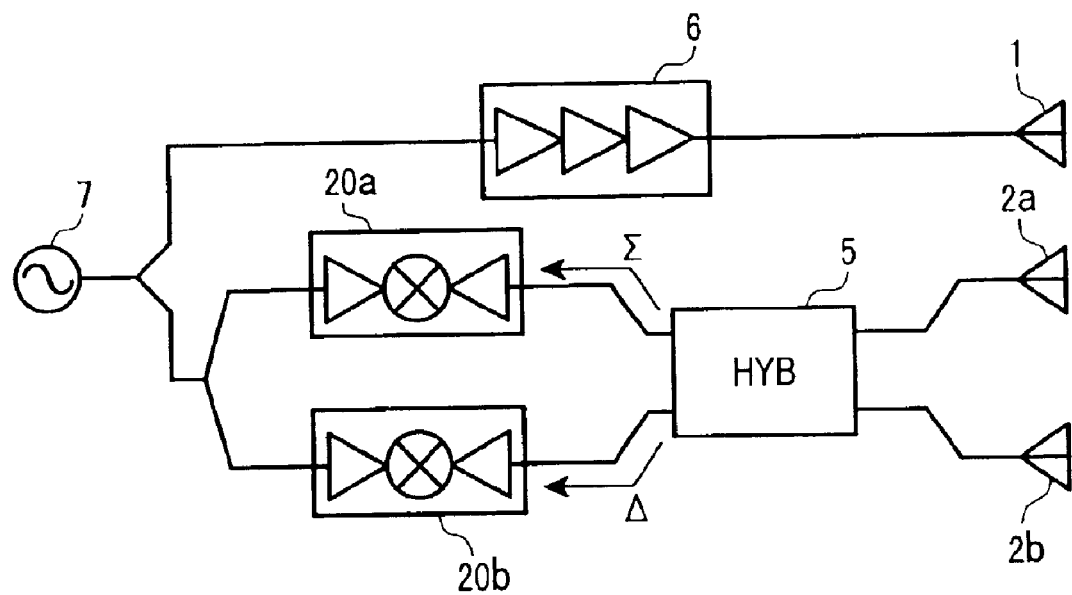
FIG. 11 is a block diagram for describing the transmitter/receiver apparatus of an automotive radar according to the prior art.

FIG. 10 shows an automotive radar, which is a seventh preferred embodiment of the present invention. In this embodiment, the edges 15 of the antenna plate 3 on which the transmitting array antenna 1 and the receiving array antennas 2a and 2b are arranged and which serves to ground the antennas are stepped, with the transmitting antenna 1 protruding farther ahead than the receiving antennas 2a and 2b.

As described above, while the returning reflected wave which is Doppler-shifted by the obstacle partly comes incident on the transmitting antenna 1, if there is any impedance mismatching within the antenna 1, it will be reradiated. Since in this embodiment the transmitting/receiving antennas are stepped, it is possible to reduce the reradiation reaching the receiving array antennas 2a and 2b. As a result, wrong detection can be prevented and a high level of azimuth accuracy can be achieved.

Apart from using the radio wave absorbers mentioned above and structuring the edges of the antenna plate to be effective for the prevention of radio wave diffraction, it is also effective to configure the antenna plate itself of a radio wave absorber. As the surface of the antenna plate absorbs radio waves, no diffraction of the radio waves occurs. Furthermore, it is also effective to coat the surface of the antenna plate with a radio wave absorber. As the surface of the antenna plate 3 absorbs radio waves, they are not diffracted. In either way, the antenna plate can be easily produced in light weight and at low cost. It goes without saying that such an antenna plate can be used as the antenna plate 3 in any of the embodiments of the invention described above. A high synergic effect can be obtained.

Although the antennas and the antenna plate 3 are supposed to be separate components in the foregoing embodiments of the invention, the invention is not limited to such configurations, but can be as effectively applied to antennas in which the antenna plate and radiating parts are integrated, for instance slotted waveguide antennas and triplate antennas.

According to the present invention, since unnecessary waves can be prevented from leaking to receiving antennas, it is made possible to realize an automotive radar having a broad detectable range capable of preventing wrong detection and excelling in azimuth accuracy.

It is further understood by those skilled in the art that the foregoing description is preferred embodiments of the disclosed device and that various changes and modifications may be made in the invention without departing from the spirit and scope thereof.

What is claimed is:

1. An automotive radar comprising:
   a transmitting antenna and receiving antennas arranged on the top face of a grounding conductor plate, and
   a radar transmitter/receiver apparatus for supplying a signal to the transmitting antenna and detecting the azimuth of an obstacle from signals of a wave reflected by the obstacle and received by the receiving antennas,
   wherein a diffracted wave prevention structure is provided at edges of the top face of said grounding conductor plate at least in part, said diffracted wave prevention structure being arranged to prevent a diffracted wave being generated through radiation from the transmitting antenna, reflection by the obstacle and diffraction at the edges and then being received by the receiving antenna.

2. The automotive radar according to claim 1, wherein said diffracted wave prevention structure comprises a radio wave absorber covering said top face edges at least in part and arranged on the top face of said grounding conductor plate.

3. The automotive radar according to claim 2, wherein a radio wave absorber is also arranged between said transmitting antenna and said receiving antennas.

4. The automotive radar according to claim 3, wherein said radio wave absorbers are comprised of a sponge material containing radio wave absorbing grains.

5. The automotive radar according to claim 3, further comprising a radome covering the front of said transmitting antenna and said receiving antennas.

6. The automotive radar according to claim 5, wherein said radio wave absorbers are fitted in advance to the radome.

7. The automotive radar according to claim 3, wherein the height of said radio wave absorbers from the top face of said transmitting antenna is so selected as to prevent radio waves from radiating outside the range of obstacle detecting angles, and their height from the top faces of said receiving antennas is so selected as to prevent radio waves from arriving from outside the range of obstacle detecting angles.

8. The automotive radar according to claim 2, wherein said radio wave absorber is comprised of a sponge material containing radio wave absorbing grains.

9. The automotive radar according to claim 2, further comprising a radome covering the front of said transmitting antenna and said receiving antennas.

10. The automotive radar according to claim 9, wherein said radio wave absorber is fitted in advance to the radome.

11. The automotive radar according to claim 2, wherein the height of said radio wave absorber from the top face of said transmitting antenna is so selected as to prevent radio waves from radiating outside the range of obstacle detecting angles, and its height from the top faces of said receiving antennas is so selected as to prevent radio waves from arriving from outside the range of obstacle detecting angles.

12. The automotive radar according to claim 1, wherein the top face edges of said grounding conductor plate are at least in part made up of at least two faces.

13. The automotive radar according to claim 1, wherein the top face edges of said grounding conductor plate at least in part have a curved face.

14. The automotive radar according to claim 1, wherein the top face edges of said grounding conductor plate are provided with projections.

* * * * *

UNITED STATES PATENT AND TRADEMARK OFFICE
CERTIFICATE OF CORRECTION

PATENT NO. : 6,933,881 B2
APPLICATION NO. : 10/618736
DATED : August 23, 2005
INVENTOR(S) : Shinoda et al.

It is certified that error appears in the above-identified patent and that said Letters Patent is hereby corrected as shown below:

In the claims, please amend claims 1, 2, 10 and 12 as follows:

Col. 7, claim 1. should read --An automotive radar comprising:

a transmitting antenna and receiving antennas arranged on the top face of a grounding conductor plate, and a radar transmitter/receiver apparatus for supplying a signal to the transmitting antenna and detecting the azimuth of an obstacle from signals of a wave reflected by the obstacle and received by the receiving antennas, wherein a diffracted wave prevention structure is provided at ~~edges~~ two of the four sides of the top face of said grounding conductor plate at least in part, the two of the four sides extending substantially parallel to an imaginary boundary line between the transmitting antenna and the receiving antenna, and said diffracted wave prevention structure being arranged to prevent a diffracted wave being generated through radiation from the transmitting antenna, reflection by the obstacle and diffraction at the edges and then being received by the receiving antenna.--

Col. 7 & 8, Claim 2. should read --The automotive radar according to claim 1, wherein said diffracted wave prevention structure comprises a radio wave absorber covering said ~~top face edges~~ two of the four sides at least in part and arranged on the top face of said grounding conductor plate.--

UNITED STATES PATENT AND TRADEMARK OFFICE
CERTIFICATE OF CORRECTION

PATENT NO. : 6,933,881 B2
APPLICATION NO. : 10/618736
DATED : August 23, 2005
INVENTOR(S) : Shinoda et al.

It is certified that error appears in the above-identified patent and that said Letters Patent is hereby corrected as shown below:

Col. 8 claim 10. should read --The automotive radar according to claim 1, wherein the ~~top face edges~~ two of the four sides of said grounding conductor plate are at least in part made up of at least two faces.--

Col. 8 claim 11. should read --The automotive radar according to claim 1, wherein the ~~top face edges~~ two of the four sides of said grounding conductor plate at least in part have a curved face.--

Col. 8 claim 12. should read --The automotive radar according to claim 1, wherein the ~~top face edges~~ two of the four sides of said grounding conductor plate are provided with projections.--

Signed and Sealed this

Twenty-second Day of May, 2007

JON W. DUDAS
*Director of the United States Patent and Trademark Office*